Feb. 28, 1967  J. E. BURGER  3,307,023
ELECTRONIC COUNTER
Filed Sept. 5, 1963  2 Sheets-Sheet 1
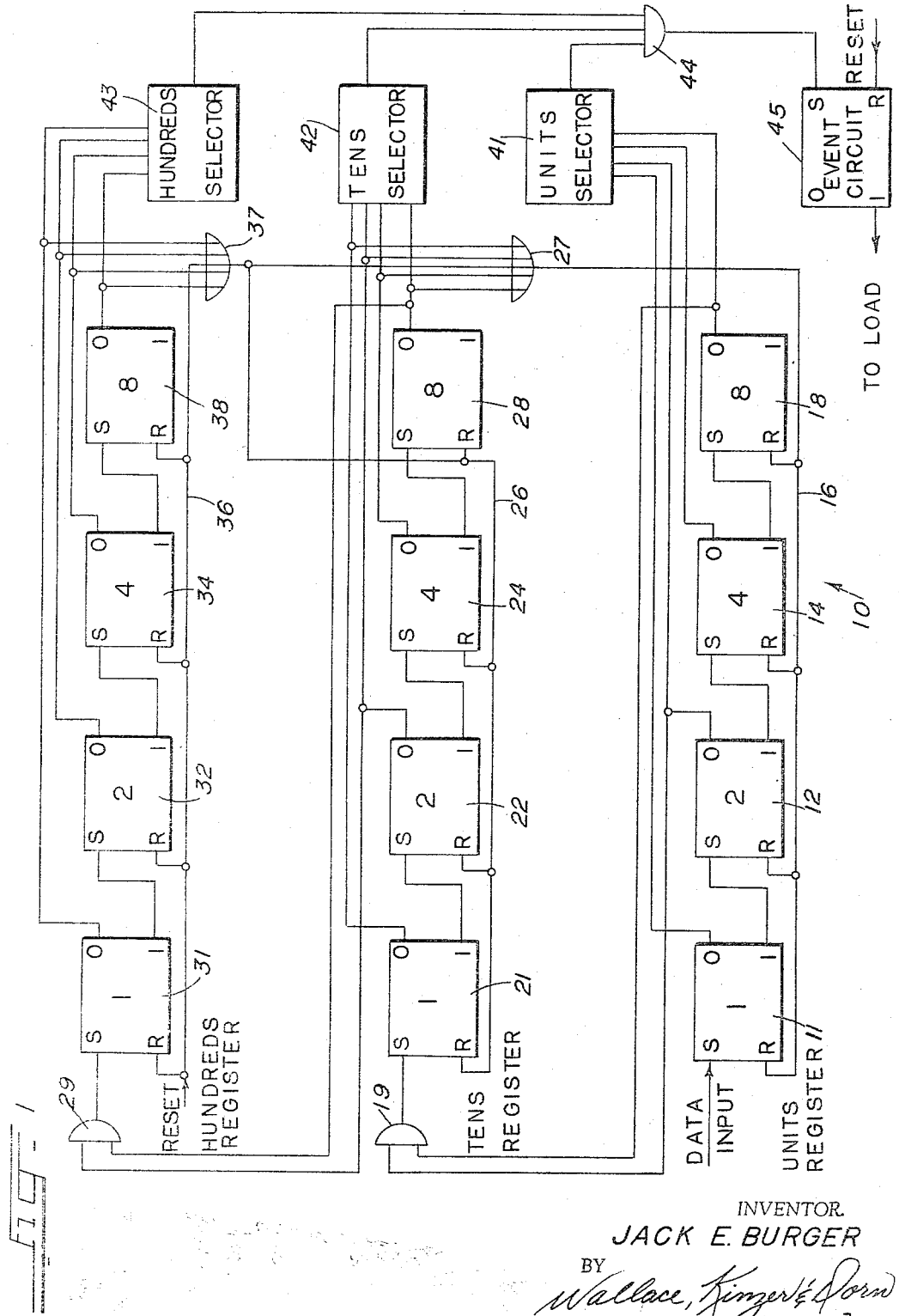
INVENTOR.
JACK E. BURGER
BY
Wallace, Kinzer & Horn
ATTYS.

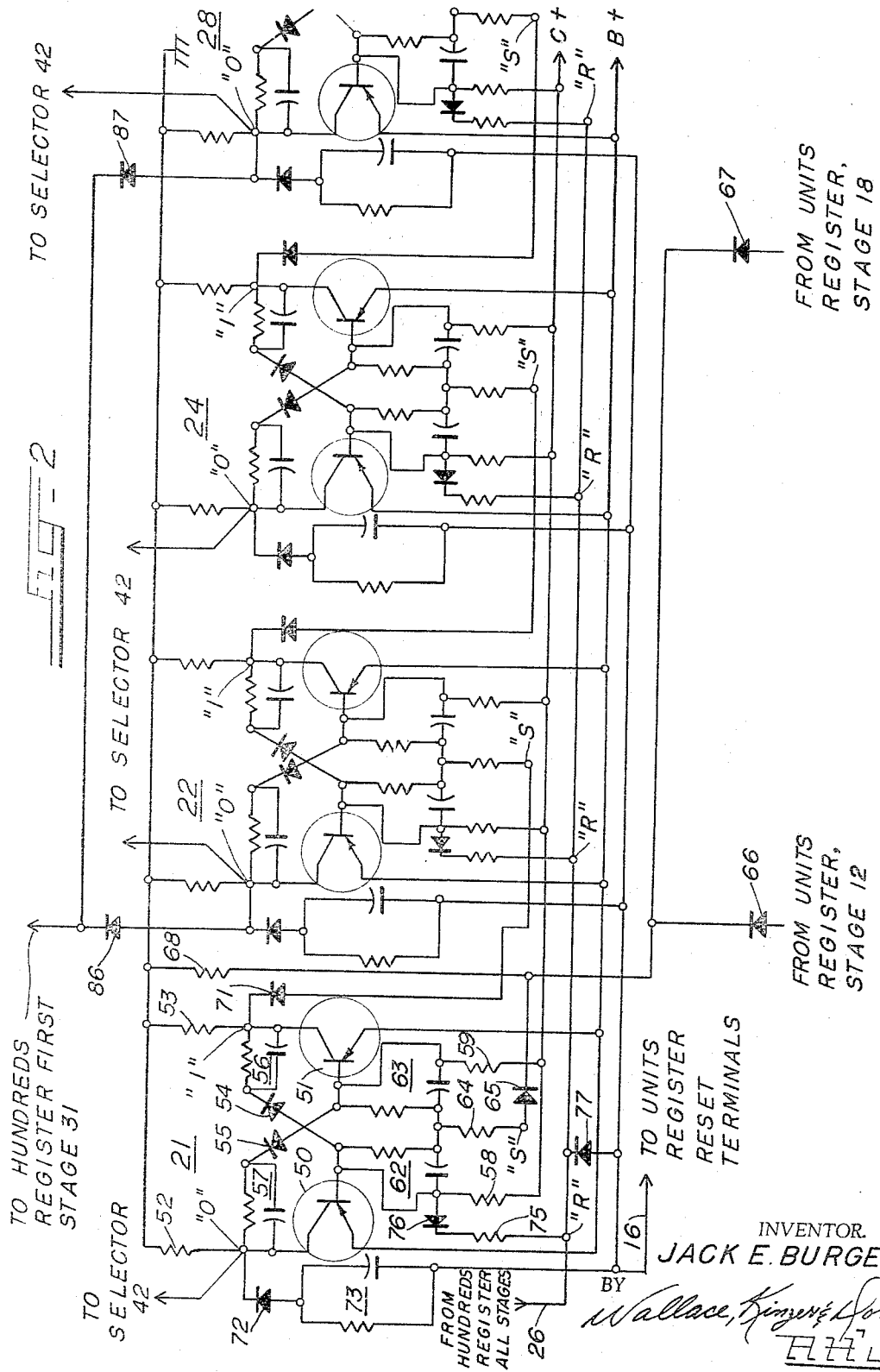

United States Patent Office 3,307,023
Patented Feb. 28, 1967

3,307,023
ELECTRONIC COUNTER
Jack E. Burger, Chagrin Falls, Ohio, assignor to Addressograph-Multigraph Corporation, Wilmington, Del., a corporation of Delaware
Filed Sept. 5, 1963, Ser. No. 306,789
6 Claims. (Cl. 235—92)

This invention relates to a new and improved decimal-ordered minor-base counter and storage apparatus and more specifically to a combination binary-decimal counter and storage apparatus.

In computers and other business machines, it is sometimes necessary to use an uncoded input signal, comprising essentially a series of pulses, for the control of one or more operations of functions of the machine. In particular, it may be desirable to initiate a given machine operation upon the occurrence of a predetermined number of pulses, which may be unevenly spaced in time and which, under given circumstances, may fail to reach the total that signals the requirement for the controlled machine operation. Storage and counter apparatus, accordingly, must be provided to determine the number of received input pulses and to actuate the controlled portion of the machine whenever the predetermined pulse total is reached.

In most data storage systems, the most economical and effective form of storage is in accordance with binary notation. On the other hand, where a given quantity is subject to variation under the control of a machine operator, it is preferable to provide for setting up that quantity in terms of decimal notation, since it is usually easiest for the machine operator to think in terms of decimal quantities.

It is a principal object of the present invention to provide a combination decimal and minor-base counter and storage apparatus that is effective to store received uncoded pulse signals in accordance with the minor base notation but in a decimally ordered form permitting decimal control of the counter.

A more specific object of the invention is to store an uncoded pulse input signal in a series of binary storage stages arranged in decimal order to afford a counter and storage apparatus that functions in accordance with both binary and decimal notations.

A further object of the invention is to utilize ordinary binary storage devices, such as conventional flip-flop circuits, magnetic core devices, or the like, without modification, in a decimally ordered storage device that can be set for different numerical values in accordance with decimal notation.

A particular object of the invention is to arrange unordered and uncoded input data into decimal order, storing the data in accordance with binary notation and without full translation, in a system providing for utilization of the data in accordance with its decimal value.

A specific object of the invention is to afford a simple and inexpensive combination binary and decimal counter and storage apparatus that is both rapid and accurate in operation.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:
FIG. 1 is a block diagram of a combination binary-decimal counter and storage apparatus constructed in accordance with a preferred embodiment of the present invention; and
FIG. 2 is a detailed circuit diagram of one register from the apparatus of FIG. 1.

FIG. 1 illustrates a combination counter and storage apparatus in which pulse data are stored in binary form but are arranged in accordance with decimal notation to permit control of a machine operation or other event in accordance with decimally set quantities. The apparatus 10 includes a "units" register comprising four bi-stable trigger or flip-flop circuits 11, 12, 14 and 18, a "tens" register comprising four similar flip-flop circuits 21, 22, 24 and 28, and a "hundreds" register that includes four bi-stable trigger circuits 31, 32, 34 and 38. The counter and storage apparatus 10 thus has a capacity of nine hundred ninety-nine; the capacity of the system could be increased to any desired value by adding additional registers as will be apparent from the detailed description set forth hereinafter.

The flip-flop circuit 11 may be of conventional construction and includes an input or "set" terminal S, a re-set terminal R, and two output terminals designated as 0 and 1 terminals, respectively. The input or set terminal S of the flip-flop 11 is connected to an external source of pulse signals designated in the drawing as the data input. The 1 output terminal of flip-flop 11 is connected to the set or input terminal S of the next flip-flop circuit in the units register, the circuit 12. The 1 output terminal of flip-flop 12 is in turn connected to the set terminal of the next flip-flop circuit 14 and the corresponding output terminal of circuit 14 is connected to the set terminal of the last flip-flop circuit in the units register, circuit 18. Thus, flip-flop circuits 11, 12, 14 and 18 are connected in series in a shift register to provide for sequential recording of input data pulses, in accordance with binary notation. The register has a total capacity of 1111 in binary notation, corresponding to a capacity of fifteen in decimal notation.

The "tens" register of apparatus 10 is essentially similar to the units register, the four binary flip-flops 21, 22, 24 and 28 being connected together in series, with the 1 output terminal of each flip-flop being connected to the set terminal S of the next higher order stage in the register. The hundreds register is similarly connected, with each of the flip-flops 31, 32, and 34 having its 1 output terminal connected to the input or set terminal of the next succeeding flip-flop in the register. It is thus seen that the counter and storage apparatus 10 includes a plurality of shift registers, in this instance three shift registers, each of which is representative of a predetermined decimal order (units, tens, hundreds) and each of which includes a number of binary storage stages sufficient to record a decimal value. The flip-flops incorporated in the individual registers of the apparatus are bi-stable devices; that is, each stage has two stable storage conditions, one stable condition being representative of a binary zero and the other stable condition corresponding to a binary one.

The input to the tens register of apparatus 10 comprises an AND circuit 19 that is connected to the set or input terminal of the first stage in the register, flip-flop 21. The AND circuit 19 is provided with two inputs; one input for the AND circuit is taken from the 0 output terminal of the second binary stage 12 in the units register. The remaining input to AND circuit 19 is provided from the 0 output of the last flip-flop 18 in the units register. Selection of the 0 output terminals for the connections to AND circuit 19 is based upon the desired polarity for the input signal to the tens register.

The circuit arrangement is such that when the binary number 1010 is recorded in the units register, placing circuits 12 and 18 in their second stable state corresponding to a binary one, an output signal is produced by the AND circuit 19 and is applied to the input of the tens register, the set terminal of the circuit 21. Thus, the AND circuit 19, with its connections to the second and final stages of the units register, affords a decimal carry integer-register transfer circuit connecting the two decimally significant stages of the units register to the input of the next higher order register, in this instance the tens register.

A similar decimal carry integer-register transfer circuit connects the tens register to the hundreds register. In the tens register, of course, the decimally significant stages are flip-flop circuits 22 and 28. The 0 output terminal of each of these flip-flops is connected to an AND circuit 29 that in turn is connected to the data input terminal for the hundreds register, the set terminal of the flip-flop 31. It is thus seen that the apparatus 10 provides decimal carry inter-register transfer means connecting the decimally significant stages of each lower order register to the input of the next higher order register to apply an input signal to the higher order register whenever a full decimal count is recorded in the lower order register.

Whenever a full decimal count is reached in the units register, and this count is carried forward to the tens register, it is necessary to clear the units register for the recording of subsequent information. This cannot be accomplished simply by permiting the units register to count out to its full capacity, since the capacity of this register exceeds the desired decimal count. Re-setting of the units register is accomplished by means of a re-set transfer circuit including an OR circuit 27 having a plurality of individual inputs. Four of the inputs to the OR circuit 27 are each individually connected to the 0 output terminal of one of the stages 21, 22, 24 and 28 in the tens register of the counter. Again, selection of terminals in the register, for use in the reset circuit, is determined by the polarity desired for the reset signals. The output of OR circuit 27 is applied to a reset circuit 16 connected to all of the reset terminals for the flip-flop circuits 11, 12, 14 and 18 in the units register.

A similar re-set transfer circuit is provided for re-setting the tens register. This re-set transfer circuit includes an OR circuit 37 having four individual inputs connected to the 0 output terminals of the individual flip-flop circuits in the hundreds register. The output from the OR circuit 37 is connected, by a circuit 26, to all of the re-set terminals in the tens register. The output from OR circuit 37 is also connected in a fifth input to the OR circuit 27 for the re-set circuit 16 of the units register. Thus, the counter is provided with re-set transfer means that connects each stage of each higher order register to all of the re-set circuits of all lower order registers to re-set the lower order registers whenever any stage in the higher order register changes from its "zero" storage condition to its "one" condition.

Since the hundeds register is the highest order register, this register must be re-set from an external signal source. A separate re-set circuit 36 is connected to the re-set terminals of each of flip-flops 31, 32, 34 and 38 and to OR circuit 37; suitable re-set signals may be supplied from any desired source associated with the business machine or other equipment in which the counter is employed.

The output for the counter and storage device 10 comprises three individual selector devices 41, 42 and 43. Device 41, designated as the units selector, is provided with four input circuits that are individually connected to the 0 output terminals of the four flip-flops 11, 12, 14 and 18 in the units register of the counter. Similarly, the tens selector 42 is connected to one output terminal of each of the flip-flop stages in the tens register. In the same manner, the hundreds selector 43 is provided with four input terminals each connected to one output terminal of a flip-flop in the hundreds register. Again, circuit connections from the binary stages may be taken from the 1 terminals if desired, depending primarily on whether negative-going or positive-going signals are desired.

Each of the selector devices 41, 42 and 43 comprises a binary-coded selector device that is settable to a given decimal value. An example of a device suitable for this purpose is a binary-coded decimal selector switch that may be set to any desired decimal value from 0 through 9, the selector switch connections being such as to complete a circuit connection through the switch only for the set decimal value. Binary-coded decimal selector devices of this general kind are well known in the art and are commercially available; a typical example is the series TSB switch manufactured by Chicago Dynamic Industries Inc. Accordingly, no description of the internal construction of the selector devices 41, 42 and 43 is provided herein.

The output circuits of the selector devices 41, 42 and 43 are each individually connected to an AND circuit 44, the output of the AND circuit being connected to a control or "event" circuit 45. The event circuit may constitute any diesired control circuit that is actuatable in response to received pulse signals. In this instance circuit 45 is shown as a conventional trigger or flip-flop with the AND circuit 44 connected to the set terminal of the flip-flop. The output of the event circuit is connected to a suitable load, which may constitute a relay or other control device in a business machine or other load device. Suitable means are provided for re-setting the event circuit by applying a re-set signal to the re-set terminal of the flip-flop.

In considering the operation of the combination binary decimal counter and storage apparatus of FIG. 1, it may first be assumed that all of the flip-flop circuits of the units, tens and hundreds registers are in their initial settable state, referred to hereinafter as their "zero" condition. Pulse signals representative of a series of repetitive operations, such as sensing of individual business instruments, or of other items to be counted, is applied to the data input to the counter, this being the set terminal of the initial flip-flop stage 11. The first received pulse actuates the flip-flop 11 from its initial or "zero" condition to its "one" condition. The next succeeding pulse returns the flip-flop 11 to its "zero" stable state and produces an output signal that is applied to the next flip-flop 12 in the units register, setting flip-flop 12 from its "zero" state to its "one" condition. This process is continued, the units register functioning as a shift register and recording the input pulses in accordance with conventional binary notation.

Upon application of the tenth input pulse to the input terminal of the units register, the binary number recorded in the register is 1010, with both flip-flops 12 and 18 in the "one" state. As soon as this occurs, the AND circuit 19 is actuated, applying an input signal to the first stage 21 of the tens register. Circuit 21 changes from its "zero" state to its "one" condition, producing an output signal that is applied to the OR circuit 27 and thence to the re-set circuit 16 for the units register, re-setting all of the flip-flops in the units register to their original "zero" condition.

The counting and storage process continues as described above, with input signal pulses being applied to the initial stage 11 of the units register. Each time a count to a total of ten is reached in the units register, an output signal is supplied through AND circuit 19 to the input stage of the tens register. Each time the count advances one stage through the tens register, the units register is re-set and thus conditioned for receiving additional data.

When a count of one hundred is reached, both of the decimally significant stages 22 and 28 of the tens register are actuated to their second stable state. As a consequence, an output signal is supplied to the AND circuit 29 in the input to the hundreds register and the first flip-flop 31 in this register is changed from its "zero" condition to its "one" condition. This change in operatng condition of the first stage of the hundreds register produces an output signal that is supplied through the OR circuit 37 to the re-set circuit 26 of the tens register, clearing the tens register for the receipt of additional information. The same signal is supplied through the OR circuit 27 to the re-set circuit 16 for the units register, clearing that register for the receipts of further information. Thus, the counting and storage process proceeds, permitting the counting and storage of any decimal value up to nine hundred ninety-nine.

In considering operation of the selector devices 41 through 43, it may be assumed that each of these selectors is set for a particular numercial value. For convenience, it may be considered that selector 41 is set for the decimal value 1, selector 42 for the decimal value 2, and selector 43 for the decimal value 3. Thus, the selectors, in combination, are set for the numerical value three hundred twenty-one.

Under the circumstances, the count set in the selectors is reached in the storage and counter apparatus 10 when flip-flops 11, 22, 31 and 32 are each set to their one condition. With the flip-flop 11 in its "one" condition, a circuit is completed through unit selector 41 to the AND circuit 44. With the trigger 22 in its "one" condition, a circuit is completed through the tens selector 42 to the AND circuit 44. Because both of the flip-flops 31 and 32 are in their "one" condition, the hundreds selector 43 affords a complete output circuit to the AND circuit 44. The AND circuit 44 thus provides an input signal to the event circuit 45, actuating this control device to produce an output signal to the business machine or other load, and thus actuating the desired function or operation controlled by the over-all system.

The controlled or load apparatus (not shown in the drawings) may be utilized to produce a re-set signal, when the controlled operation is completed, that is supplied to the re-set circuit 36 for the hundreds register, clearing this register and automatically clearing the lower order registers through the connections to OR circuits 37 and 27. In this manner, the counter and storage apparatus 10 is conditioned for the next control operation. If the function controlled or actuated by the system requires any substantial period of time, it may be desirable to gate the input to the counter 10, providing for interruption of this input during the required operational period. This and other variations of the control arrangement will, of course, depend upon the particular application in which the counter and storage apparatus 10 is employed.

Under given circumstances, the unit selector 41 and the tens selector 42 may be set for a total count of twelve. When a total count of ten is reached in the units register, both of the flip-flops 12 and 18 are momentarily actuated to their "one" condition, as described above. The two flip-flops produce output signals which conjointly actuate the AND circuit 19 and produce an input signal that in turn actuates the flip-flop 21 to its one condition. Of course, and as described hereinabove, the actuation of the flip-flop 21 to its "one" condition produces a re-set signal that almost immediately clears stages 12 and 18 of the units register. However, there is an infinitesimal period, determined by the speed of operation of the flip-flop circuits, in which all three of the circuits 12, 18 and 21 are in the "one" condition, despite the fact that only a total count of ten has been received by the counter. Thus, during this re-set interval, the selectors 41 and 42 might produce output signals indicating that the desired count of twelve has been reached.

It is a relatively simple matter to avoid this erroneous operation. Thus, the time constant of the output signal from the selectors to the event circuit 45 may be made longer than the re-set time for the binary counter registers. This insures restoration of flip-flops 12 and 18 to their original "zero" condition before the event circuit 45 can respond to the momentary erroneous signal. Similarly, a conditioning switch circuit may be employed to delay actuation of the event circuit 45 for a time interval sufficient to re-set the units register, precluding erroneous operation during the re-set interval. Alternatively, the selector devices can be connected to the final stage 18 of the units register, and specifically to the "one" output of that stage, to apply an inhibit signal, in effect a "not 8 signals", to the event circuit when the count of ten is reached. In a similar manner, the alternative output from the flip-flop 12 may be employed as a "not 2" signal to prevent the actuation of event circuit 45 when the selectors 41, 42 are set for a count of eighteen, in which instance a similar erroneous operation could take place. Of course, both of the time delay arrangements described above would prevent erroneous operation on the numeral eighteen as well as on the value twelve.

The above mentioned problem of erroneous operation during the re-set interval might also occur when the hundreds selector 43 and the tens selector 42 are set for one hundred twenty or for one hundred eighty. However, either of the time delay or coding arrangements discussed above in relation to the tens and units registers are effective to preclude any such erroneous operation.

FIG. 2 affords a detail schematic diagram of a typical construction that may be utilized for the tens register of the counter and storage apparatus, the tens register having been selected because it includes both the necessary re-set transfer circuit to a lower order register (the units register) and the inter-register transfer circuit connecting to the next higher order register (the hundreds register).

In the circuit arrangement shown in FIG. 2, the initial stage 21 comprises a pair of transistors 50 and 51. The collector electrodes of transistors 50 and 51 are connected through the resistors 52 and 53, respectively, to system ground.

The emitters of the two transistors are connected to a suitable D.C. supply designated as B+. The base electrode of transistor 50 is connected through a diode 54 and a parallel RC circuit 56 to the collector of transistor 51. The base electrode of transistor 51 is similarly connected through a diode 55 and a parallel RC circuit 57 to the collector of transistor 50. The base electrode of transistor 50 is returned to a suitable D.C. supply, designated as C+, through a resistor 58. The balanced construction is continued with a resistor 59 that returns the base electrode of transistor 51 to the C+ supply.

The input connection to the flip-flop or trigger circuit 21 is afforded, on the one hand, by a parallel RC circuit 62 that connects the base electrode of the transistor 50, in series with a resistor 64, to the set terminal S of the circuit. Similarly, a parallel RC circuit 63 is connected in series from the base electrode of transistor 51 through the resistor 64 to the input terminal of the circuit. The input connection from the units register to the S terminal of circuit 21 is provided through a diode 65 that is connected through an additional diode 66 to the second stage 12 of the units register and through another diode 67 to the fourth stage 18 of that register. The common junction of the diodes 65–67 is returned to system ground through a resistor 68, the diodes 65–67 and the resistor 68 affording the AND circuit 19 referred to hereinabove in connection with FIG. 1.

The succeeding stages 22, 24 and 28 of the tens register, as shown in FIG. 2, are essentially identical with circuit 21. Thus, each of these circuits comprises a two-transistor bi-stable trigger circuit of the kind sometimes referred to as an Eccles-Jordan circuit. Inasmuch as the circuit arrangements are essentially identical to circuit 21, no detailed description of the individual impedances and other circuit elements is necessary.

The connection from stage 21 of the register to stage 22 is taken from the 1 terminal of circuit 21 to the set terminal S of circuit 22, as noted hereinabove. In the circuit arrangement illustrated in FIG. 2, the 1 terminal of flip-flop 21 is designated as the collector electrode of the transistor 51, and this terminal is connected through a diode 71 to the set terminal of the succeeding stage. A similar connection is provided from stage 22 to stage 24 and from stage 24 to stage 28.

The re-set transfer circuit from the tens register to the units register comprises a diode 72 that is connected to the 0 terminal of flip-flop circuit 21, this terminal being located at the collector electrode of transistor 50. The diode 72 is connected in series with a parallel RC circuit 73 that is connected to the re-set circuit 16 linking all of the re-set terminals of the units register (see FIG. 1). A similar combination of diode and parallel RC circuit is provided in connection with each stage of the tens register, as shown in FIG. 2, these circuits conjointly constituting most of the OR circuit 27 (FIG. 1).

The re-set connection to the tens register illustrated in FIG. 2, taken from the hundreds register, includes circuit connections to all stages of the hundreds register, the connecting circuits (not illustrated) each being essentially similar to the circuit arrangement 72, 73 connecting each tens register stage to the units register. That is, the circuits in the hundreds register connecting to circuit 26 in FIG. 2 would be essentially similar to the circuit connections shown for the re-set circuit 16. Within stage 21, the re-set connection extends from the terminal R, indicated as a part of the re-set circuit 26, through a resistor 75 and a diode 76 to the base electrode of the transistor 50. Corresponding resistor-diode connections are afforded in each of the succeeding stages 22, 24 and 28 of the tens register. In addition, and as a part of the OR circuit 27 (FIG. 1) the re-set circuit 26 for the tens register is connected through a diode 77 to the re-set circuit 16 that connects to all stages of the units register.

FIG. 2 also illustrates a part of the decimal carry inter-register transfer circuit that connects the tens register to the hundreds register. Thus, a first diode 86 is shown connected to the 0 terminal of the second binary stage 22 of the tens register. Similarly, a diode 87 is connected to the 0 terminal of stage 28. These two diodes are connected to each other in the same manner as diodes 66 and 67 linking the stages 12 and 18 of the units register to the tens register. It is thus seen that the decimal carry inter-register transfer circuits, between the several registers of the apparatus, may all be essentially similar to each other.

The operation of the tens register, as illustrated in FIG. 2, is predicated upon the designation of the initial or binary zero state of each of the trigger circuits as that state in which the first transistor in the circuit is conductive and the second transistor is cut off. Thus, with particular reference to trigger circuit 21, this circuit records a binary zero whenever transistor 50 is conductive and transistor 51 is essentially cut off. Conversely, a binary "one" is recorded in this stage when transistor 51 is conductive and transistor 50 is cut off.

Whenever the second stage 12 of the units register is actuated from its binary zero condition to its binary one condition, a negative-going pulse is supplied through the diode 66 to the diode 65, but this pulse is not of sufficient amplitude to apply an effective input signal through diode 65 to the input terminal S of trigger circuit 21. Similarly, whenever the fourth stage 18 of the units register changes from its binary zero condition to its binary one condition, a negative-going signal is supplied through the diode 67, but is insufficient to pass an appreciable signal through diode 65. However, when both of the stages 12 and 18 of the units register are actuated to the binary one condition, the resulting current through the resistor 68 produces a sufficient voltage, at the diode 65, to afford a negative-going input signal of appreciable amplitude at the input terminal S of the circuit 21. Assuming that transistor 50 has heretofore been conductive and that transistor 51 has been cut off, this pulse signal is effective to change the operating condition of the trigger circuit, driving transistor 50 to cut off, and rendering transistor 51 conductive, in accordance with the familiar operating characteristics of trigger circuits of this kind. In this manner, a binary one is recorded in stage 21 of the tens register.

In its initial state, with a binary zero recorded by virtue of the fact that transistor 50 is conductive, circuit 21 affords a relatively high positive potential at the output terminal designated as the 0 terminal. When circuit 21 changes to its second stable condition, as described above, and transistor 50 is cut off, a negative-going pulse signal is produced at the 0 terminal of the circuit. This negative pulse signal is supplied through the circuit 72, 73 to the re-set circuit 16 of the units register and re-sets all stages of the units register to their initial (binary zero) operating condition.

The next time that a total count of ten is recorded in the units register, resulting in the application of an input signal to the S terminal of circuit 21 from stages 12 and 18 of the units register, as described hereinabove, the operating condition of circuit 21 is again reversed. That is, transistor 50 is again actuated to high conductivity and transistor 51 is cut off. The resultant reduction in current through the resistor 53 connected in the emitter-collector path of transistor 51 produces a negative-going signal at the 1 output terminal of the circuit. This signal is supplied to the S input terminal of the succeeding stage 22 and actuates that stage from its initial stable condition to its second stable condition.

When circuit 21 is re-set to its initial stable condition, representative of a binary zero, a positive-going signal is produced at the 0 output terminal of the circuit. This signal is blocked by the diode 72 and is not applied to the re-set circuit 16 for the units register. But the switching of circuit 22 from its first to its second stable state does produce a negative-going signal at the output terminal 0 for this stage. Consequently, the units register is again re-set and is ready for the reception and recording of additional signals in accordance with the established decimal pattern. It will be seen that each time a decimal carry signal is supplied to the tens register of FIG. 2, from the units register, one stage of the tens register is actuated from its zero condition to its one condition, affording a re-set signal to the circuit 16 and assuring re-setting of the units register. In a similar manner, all stages of the tens register are re-set each time this register produces a carry signal that is applied to the hundreds register, since the hundreds register is the same in construction as the tens register and affords a re-set signal to the lower order decimal register each time it advances by one count. In addition, each time the hundreds register is re-set, in any stage, the re-set signal that is supplied to the tens register is also applied through the diode 77 to the re-set circuit 16 of the units register.

In order to afford a more complete illustration of the present invention, specific circuit data for the tens register illustrated in FIG. 2 are set forth in detail hereinafter. It should be understood that these data are provided solely by way of illustration and in no sense as a limitation on the present invention.

Transistors 50, 51—Type TS 604
Diodes 54, 55—Type 1N67A
Diode 65—Type 1N67A
Diodes 66, 67—Type 1N67A
Diode 71—Type 1N67A
Diode 72—Type 1N67A
Diode 76—Type 1N67A
Diode 77—Type 1N67A
RC circuits 56, 57—3.6 kilohms, 0.01 microfarad RC circuits 62, 63—560 kilohms, 0.0033 microfarad
RC circuit 73—15 megohms, 0.22 microfarad
Resistors 52, 53—100 ohms
Resistors 58, 59—3.6 kilohms
Resistor 64—560 ohms
Resistor 68—1 kilohm
Resistor 75—2.2 kilohms
B+—12 volts
C+—15 volts
System ground—0 volt It will be appreciated that the selection of a "ground" voltage is arbitrary and that this voltage is not necessarily representative of earth ground, the other voltages being stated in relation to the system ground.

Hence, while preferred embodiments of the invention have been described and illustrated, it is to be understood that they are capable of variation and modification and I therefore do not wish to be limited to the precise details set forth, but desire to avail myself of such changes and alterations as fall within the purview of the following claims.

I claim:

1. A combination decimal and minor base counter and storage apparatus comprising:

a plurality of registers, each representative of a predetermined decimal order and each including a number of minor base storage stages, sufficient to record a decimal number, each stage having stable storage conditions equal in number to the base number, said registers each including a data input circuit connected to the first stage of the register and a reset circuit connected to all stages of the register;

decimal-carry inter-register transfer means connecting the decimally significant stages of each lower order register to the data input circuit of the next higher order register to apply an input signal thereto whenever a full decimal count is recorded in the lower order register;

reset transfer means connecting each stage of each higher order register to the reset circuits of all lower order registers to apply a reset signal thereto whenever any stage in the higher order register changes storage condition;

and output circuits connected to each stage of each register to afford decimally ordered signals, encoded in accordance with the minor base, representative of the numerical data stored in said apparatus.

2. A combination binary-decimal counter and storage apparatus comprising:

a plurality of registers, each representative of a predetermined decimal order and each including a number of binary storage stages sufficient to record a decimal value, each stage having two stable storage conditions, said registers each including a data input circuit connected to the first stage of the register and a reset circuit connected to all stages of the register;

decimal-carry inter-register transfer means connecting the decimally significant stages of each lower order register to the data input circuit of the next higher order register to apply an input signal thereto whenever a full decimal count is recorded in the lower order register;

reset transfer means connecting each stage of each higher order register to the reset circuits of all lower order registers to apply a reset signal thereto whenever any stage in the higher order register changes storage condition;

and output circuits connected to each stage of each register to afford decimally ordered binary coded signals representative of the numerical data stored in said apparatus.

3. A combination binary-decimal counter and storage apparatus comprising:

a plurality of registers, each representative of a predetermined decimal order and each including four binary storage stages, each stage comprising a flip-flop circuit having first and second stable storage conditions indicative of a binary 0 and a binary 1, respectively, said registers each including a data input circuit connected to the first stage of the register and a reset circuit connected to all stages of the register;

decimal-carry inter-register transfer means comprising an AND circuit connecting only the second and last stages of each lower order register to the data input circuit of the next higher order register to apply an input signal thereto whenever said second and last stages are both in their second stable conditions, indicating that a full decimal count is recorded in said lower order register;

reset transfer means connecting each stage of each higher order register to the reset circuits of all lower order registers to apply a reset signal thereto whenever any stage in the higher order register changes storage condition;

and output circuits connected to each stage of each register to afford decimally ordered binary coded signals representative of the numerical data stored in said apparatus.

4. A combination binary-decimal counter and storage apparatus comprising:

a plurality of registers, each representative of a predetermined decimal order and each including four binary storage stages, each stage having two stable storage conditions, said registers each including a data input circuit connected to the first stage of the register and a reset circuit connected to all stages of the register;

decimal-carry inter-register transfer means connecting the second and fourth stages of each lower order register to the data input circuit of the next higher order register to apply an input signal thereto whenever a full decimal count is recorded in the lower order register;

reset transfer means comprising an OR circuit connecting every stage of each higher order register to the reset circuit of the next lower order registers to apply a reset signal thereto whenever any stage in the higher order register changes storage condition;

and output circuits connected to each stage of each register to afford decimally ordered binary coded signals representative of the numerical data stored in said apparatus.

5. A combination binary-decimal counter and storage apparatus comprising:

a plurality of registers, each representative of a predetermined decimal order and each including four binary storage stages, each stage having first and second stable storage conditions indicative of a binary 0 and a binary 1, respectively, said registers each including a data input circuit connected to the first stage of the register and a reset circuit connected to all stages of the register;

decimal-carry inter-register transfer means comprising an AND circuit connecting only the second and fourth stages of each lower order register to the data input circuit of the next higher order register to apply an input signal thereto whenever said second and fourth stages are both in their second stable condition, indicating that a full decimal count is recorded in the lower order register;

reset transfer means comprising an OR circuit connecting all stages of each higher order register to the reset circuit of the next lower order registers to apply a reset signal thereto whenever any stage in the higher order register changes storage condition;

and output circuits connected to each stage of each register to afford decimally ordered binary coded signals representative of the numerical data stored in said apparatus.

6. A combination binary-decimal counter and storage apparatus comprising:
- a plurality of registers, each representative of a predetermined decimal order and each including a number of binary storage stages sufficient to record a decimal number, each stage having two stable storage conditions, said registers each including a data input circuit connected to the first stage of the register and a reset circuit connected to all stages of the register;
- decimal-carry inter-register transfer means connecting only the decimally significant stages of each lower order register to the data input circuit of the next higher order register to apply an input signal thereto whenever a full decimal count is recorded in the lower order register;
- reset transfer means connecting each stage of each higher order register to the reset circuits of all lower order registers to apply a reset signal thereto whenever any stage in the higher order register changes storage condition;
- a corresponding plurality of decimally-ordered binary-coded selector devices, one for each shift register, each settable to a given decimal value;
- output circuits connecting each stage of each register to a selector device associated with that register to apply decimally ordered binary coded signals, representative of the numerical data stored in said apparatus, to said selector devices;
- and a control device connected to said selector devices for actuation thereby.

References Cited by the Examiner

UNITED STATES PATENTS 2,523,244   9/1959   Woodward ---------- 235—92

MAYNARD R. WILBUR, *Primary Examiner.*

J. F. MILLER, *Assistant Examiner.*